(12) United States Patent
Berger et al.

(10) Patent No.: US 11,428,130 B2
(45) Date of Patent: Aug. 30, 2022

(54) PRESSURE-LIMITING VALVE (71) Applicants: HENGST SE, Muenster (DE); HENGST FILTER SYSTEMS (KUNSHAN) CO. LTD., Kunshan (CN)

(72) Inventors: Simon Berger, Heiden (DE); Tom Berger, Borken (DE)

(73) Assignees: HENGST SE; HENGST FILTER SYSTEMS (KUNSHAN) CO. LTD.

( * ) Notice: Subject to any disclaimer, the term of this patent is extended or adjusted under 35 U.S.C. 154(b) by 0 days.

(21) Appl. No.: 16/804,040

(22) Filed: Feb. 28, 2020

(65) Prior Publication Data

US 2020/0200058 A1 Jun. 25, 2020

Related U.S. Application Data (63) Continuation of application No. PCT/EP2018/070853, filed on Aug. 1, 2018.

(30) Foreign Application Priority Data

Aug. 29, 2017 (DE) .......................... 102017119833.4

(51) Int. Cl.
*F01M 13/04* (2006.01)
*F16K 17/04* (2006.01)
*F16K 17/08* (2006.01)

(52) U.S. Cl.
CPC ..... *F01M 13/0416* (2013.01); *F16K 17/0466* (2013.01); *F16K 17/08* (2013.01); *F01M 2013/0438* (2013.01)

(58) Field of Classification Search
CPC ....... F01M 13/0416; F01M 2013/0438; F01M 2013/0066; F01M 13/023; F01M 13/04; F01M 13/0011; F16K 17/0466; F16K 17/08; F16K 17/0413; F16K 1/54; F16K 25/005

See application file for complete search history.

(56) References Cited

U.S. PATENT DOCUMENTS 3,225,753 A * 12/1965 Bintz ................... F01M 13/023
123/574
3,308,798 A * 3/1967 Snider .................. F01M 13/023
123/572

(Continued)

FOREIGN PATENT DOCUMENTS

DE 102010029322 A1 12/2011
DE 102013220274 A1 4/2014

*Primary Examiner* — Joseph J Dallo
*Assistant Examiner* — Kurt Philip Liethen (57) ABSTRACT

A pressure-limiting valve for use in a gas line conveying a gas that includes aerosols. The pressure-limiting valve has a movable valve body, a valve seat, and a compressible coalescing medium placed therebetween. The valve body has passages and nozzle openings and the valve seat has through-holes. In the closed position, the valve functions in separator mode and in the fully open position, in impactor mode. The pressure-limiting valve according to the invention provides a more sensitive response to varying flow conditions, due to deviating surface profiles of the valve seat and coalescing medium, which provide intermediate stages of separator and impactor modes as a function of the volume of flow.

13 Claims, 5 Drawing Sheets

(56) References Cited

U.S. PATENT DOCUMENTS

| | | | | |
|---|---|---|---|---|
| 4,125,129 A * | 11/1978 | Baumann | F16K 1/54 | |
| | | | 137/42 | |
| 4,140,148 A * | 2/1979 | Richter | B65D 51/1644 | |
| | | | 137/240 | |
| 4,543,987 A * | 10/1985 | Ekeleme, Jr. | F16K 17/0413 | |
| | | | 137/522 | |
| 5,154,737 A * | 10/1992 | Jenkins | B01D 53/047 | |
| | | | 95/11 | |
| 5,533,548 A * | 7/1996 | Grant | F16K 17/0466 | |
| | | | 137/540 | |
| 8,042,529 B2 * | 10/2011 | Meinig | F01M 13/04 | |
| | | | 123/572 | |
| 2013/0032115 A1 * | 2/2013 | Zitarosa | G05D 7/0133 | |
| | | | 123/188.8 | |
| 2013/0306166 A1 * | 11/2013 | Erb | F02M 63/005 | |
| | | | 137/469 | |
| 2014/0059985 A1 * | 3/2014 | Janakiraman | B01D 45/16 | |
| | | | 55/459.4 | |
| 2019/0022346 A1 * | 1/2019 | Ishikita | A61M 16/209 | |
| 2019/0093785 A1 * | 3/2019 | Heinrich | F16K 31/0675 | |

* cited by examiner

FIG.9

PRESSURE-LIMITING VALVE

BACKGROUND INFORMATION

Field of the Invention

The invention relates to a pressure limiting valve and more particularly, to a pressure-limiting valve that separates out aerosols.

Discussion of the Prior Art

DE 10 2010 029 322 A1 discloses a conventional pressure limiting valve. The valve body in this type maintains its closed position, i.e., the valve plate is in contact with the valve seat, when the volume of flow is low. In this closed state, the gas flows through openings that are provided in the valve seat and the valve body and into the coalescing medium, which is provided between the valve seat and the valve body. Aerosols that are contained in the gas stream are collected in the coalescing medium, where they coagulate into larger droplets, and can then be separated out from the gas stream as relatively large drops.

When the volume of flow is higher, the valve body moves into its open position, counter to the force that normally holds the valve body in its closed position pressed against the valve seat. The force device may, for example, be a spring that exerts a force on the valve body. In this open position, a gap is produced between the coalescing medium and the valve seat that extends essentially across the entire surface of the coalescing medium, so that all of the openings in the valve seat are in flow connection with the gap and the gas flows through the pressure-limiting valve as through an impactor. In other words, the gas changes direction as it flows out of the nozzle openings and flows through the gap that is created between the coalescing medium and the valve seat when the valve body is in its open position, i.e., along or above the surface of the coalescing medium, rather than through the coalescing medium. As a result of this directional deflection, comparatively heavier aerosol particles are unable to make the change in direction and precipitate out of the gas onto the coalescing medium.

These types of pressure-limiting valves provide reliable separation, because, in the case of a low volume of flow, all the gas flows through the coalescing medium, and in the case of a higher volume of flow and its corresponding higher flow speeds, the valve opens up the gap and the impactor effect kicks in, thereby providing reliable impactor action with good separation effect that ordinarily would not be achieved at lower volumes of flow. In this way, conventional pressure-limiting valves firstly enable adaptation to the prevailing flow conditions in the gas line, thereby preventing an unacceptable rise in pressure, and secondly, they also ensure good separator action, even under varying flow conditions.

What is needed is a pressure-limiting valve that provides a graduated response to varying flow conditions.

BRIEF SUMMARY OF THE INVENTION

It is an object of the invention to improve the conventional pressure-limiting valve so as to provide a particularly sensitive response to varying flow conditions that occur in the gas line and thus to ensure optimal separation.

This object is achieved by a pressure-limiting valve that has a coalescing medium arranged between a valve seat and a valve body. The surfaces of the valve seat and the coalescing medium that face each other do not having mating surfaces, but rather, have surfaces that deviate from each other. This particular feature allows intermediate functional stages between the closed and fully open positions of the pressure-limiting valve, thereby enabling a graduated response to varying rates of flow in a gas line. A particularly advantageous embodiment of an oil-mist separator is one that is equipped with the pressure-limiting valve according to the invention.

The pressure-limiting valve according to the invention enables several different modes of operation. For example, it may function in a purely separator mode or in an impactor mode. Furthermore, the pressure-limiting valve also enables intermediate states of these modes of operation, thereby providing a graduated response to varying rates of flow in a gas line. One part of the coalescing medium may operate in the usual separator mode, whereby a portion of the gas flows through the coalescing medium before exiting the valve body, while at the same time another part of the coalescing medium operates in the impactor mode, whereby the remaining portion of the gas stream is guided through a gap along the surface of the coalescing medium. According to the invention, the division between separator mode and impactor mode is variable, thereby allowing the pressure-limiting valve to adapt to a varying volume of flow. Thus, for example, if a certain pressure difference—usually correlating with a specific volume of flow—is exceeded in the gas line, the pressure-limiting valve begins to open, whereby the valve plate does not move to its final open position, but rather to an intermediate position which, for example, corresponds only to a fraction of the total possible valve lift.

In a conventional pressure-limiting valve, the two surfaces of the valve seat and the coalescing medium are designed completely complementary to one another, so that opening the valve even slightly, i.e., intermediate the closed and fully open positions, results in opening up a gap across the full surface of the valve seat and any further movement of the valve body into its fully open position only increases the gap width.

In the pressure-limiting valve according to the invention, however, the profiles of the surfaces of the coalescing medium and the valve seat that face each other are deliberately constructed to not be exactly complementary to one another, but rather differ from one another in such a way that, as the valve plate moves toward the open position and is in an intermediate position between the open and closed positions, a gap opens up between the coalescing medium and the valve seat, but this gap does not extend over the entire surface of the coalescing medium. Rather, an inner region of the coalescing medium and valve seat remain in contact with each other and, thus, the valve functions here in separator mode, but an outer region of the coalescing medium has moved away slightly from the valve seat, creating a gap in this outer region, allowing the valve to function in this region in the impactor mode of operation. For purposes of clarity hereinafter, the term "gap width" shall refer to the distance between the valve seat and the coalescing medium, whereas the term "gap length" shall refer to the distance over which the gap extends along the coalescing medium and valve seat.

The coalescing medium is compressible and when the valve plate is in the closed position, the coalescing medium is pressed directly against the entire surface of the valve seat. As the distance of the valve plate from the valve seat increases, i.e., the valve plate is in a partially open or intermediate open position, the coalescing medium located therebetween becomes increasingly decompressed, and because of the deviating surface profiles of the coalescing medium and the valve seat, a gap is produced in certain areas between the coalescing medium and the valve seat, whereas the coalescing medium in other areas remains still compressed to some extent and continues to be pressed against the valve seat.

The valve seat has a nozzle arrangement that includes a plurality of nozzle openings. In this intermediate open position, those openings of the nozzle arrangement that are still covered by the areas of the coalescing medium direct that portion of the gas stream into the coalescing medium, which then exits the valve body through openings in the valve plate. One or more openings of the nozzle arrangement, however, now open into the gap formed in this intermediate stage, i.e., are in flow connection with the gap, and the portion of the gas stream that flows through those nozzle openings flows into the gap, rather than through the coalescing medium. This stream of gas then experiences a change in direction between the valve seat and the coalescing medium and flows away over the coalescing medium, rather than through it, with the heavier aerosols contained in the gas failing to make the turn and, thus, precipitating out of the gas flow. In other words, the pressure-limiting valve acts in impactor mode for this portion of the flow of gas.

As the distance between the valve body and the valve seat continues to increase, the coalescing medium is gradually further decompressed until, when the valve plate has reached its fully open position, it is no longer pressed against the valve seat in the areas of the nozzle openings. In this operating state, which occurs in the event of high pressure differences or high volumes of flow through the gas line, the pressure-limiting valve acts particularly as an impactor, whereby it is to be noted that a small proportion of the gas still flows into the coalescence material, even when operating in impactor mode, so that, as before, separator mode is still operating on this small portion of the gas. As the distance between the valve plate and the valve seat increases, so does the gap width and also the length of the gap, thereby providing an ever-increasing large-area gap. In the fully open position, the gap length is at its maximum, so that the large-area gap between the coalescing medium and the valve seat extends across all of the nozzle openings. The nozzle openings are radially spaced apart around the center of the valve seat, so that, as the gap length gradually increases from the outer region to the inner region, more nozzle openings open successively into this gap, that is to say, are in flow connection with the gap, until, in the fully open stage, all nozzle openings open into the gap.

When the pressure difference or volume of flow is low, the coalescing medium is more compressed in the area of the nozzle openings, and consequently the spacing of the fibers in the medium is denser at those locations, which improves separation at low flow speeds. At higher volume flows, as the valve moves toward the open position, the coalescing medium decompresses, the spacing between fibers increases, but because of the higher flow rate, such denser fiber spacings are no longer required. This decompression allows the coalescing medium to literally be “flushed free” of particles that possibly adhere to the medium. This flushing action may also extend the service life for the separator function by means of the coalescing medium.

It may be advantageous to construct the valve seat such, that the inner or center region of the seat is positioned closer to the coalescing medium and the valve plate than at the outer region of the valve seat. This construction of the valve seat allows the use of a coalescing medium that is produced, for example, as a flat disc from sheet material, making the coalescing medium particularly economical. Because such a coalescing medium has a planar surface, a non-planar profile of the valve seat results in the desired deviations between the two surfaces. In addition, this embodiment of a non-planar surface meeting with a planar surface results in a first gap length that is produced at the radially outer region of the valve seat when the valve begins to open, the gap length then gradually increasing inward the farther the valve plate and coalescing medium move away from the valve seat.

Working from the principle of an essentially conically shaped valve seat, several variations in the shape of the valve seat are particularly suitable for the pressure-limiting valve according to the invention. A first variant of the valve seat may be constructed with sides curved concavely from the center to the outer periphery. This construction provides a large increase in gap length with just small changes in the distance between the valve plate and the valve seat, i.e., just small changes in gap width.

In a second variant, the surface of the valve seat may be constructed with sides that are curved convexly from the center to the outer periphery. In this case, as the distance between the valve plate and the valve seat increases, the coalescing medium maintains contact against the valve seat over a comparatively long distance.

In a third variant, the surface of the valve seat is conical, the sides extending in a straight line from the center to the outer periphery, resulting in a linear relationship between the gap length and the movement of the valve plate into its open position.

Selection of one of the three described variants may depend, for example, on the composition of the gas that flows through the gas line, or how the openings are configured in the valve seat and in the valve plate.

In a fourth variant of this embodiment of the valve seat, which is conical in principle, the surface facing the coalescing medium extends in a spiral from the radially inner region to the outer periphery. This spiral construction avoids switching the valve into impactor mode in a stepped manner, because the gap length is gradually increased. This gradual increase in gap length is a particularly well adapted response to increases in gas flow, which are continuous, rather than stepped in nature.

It is also possible that the coalescing medium, rather than being constructed as a two-dimensional flat disc, may have a three-dimensional profile on the surface that faces the valve seat. For example, similar to the description of the conical valve seat variants, the surface of the coalescing medium facing the valve seat may extend substantially conically, for example, concave or convex curved or with straight lines. Alternatively, this surface of the coalescing medium may be constructed with radially extending ribs and valleys.

Rather than constructing a shaped body for the coalescing medium, which may require a complicated production process, it may be advantageous to achieve a three-dimensional structure simply by stacking a plurality of concentrically arranged flat discs of different diameters. This structure provides a basically conical but stepped profile of the surface of the coalescing medium. The plurality of flat discs of different sizes may be cut from sheet material and then placed one on top of the other and affixed to one another. With this construction, the surface of the radially inner region of the coalescing medium is closer to the valve seat than is the radially outer region. This ensures that the gap between the coalescing medium and the valve seat is initially produced in the radially outer region of the pressure-limiting valve, so that the gas can flow unhindered through this gap.

The coalescing medium may be made of a material that contains fibers, to provide overall a large surface area for the aerosol particles precipitate out on. For example, the coalescing medium may contain fibers of paper, plastic or metal.

It may be particularly advantageous to construct the coalescing medium from a non-woven fleece or material. Non-woven material is commercially available as sheet material in a wide variety of materials and in a great variety of spatial weights, so that the coalescing medium in the pressure-limiting valve according to the invention may be made in an extremely economical manner.

Particularly advantageous uses of the pressure-limiting valve according to the invention are in oil mist separators, such as are used, for example, in compressors or for crankcase ventilation in an internal combustion engine, and generally, in all venting situations in which a mist, particularly an oil mist, is produced.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
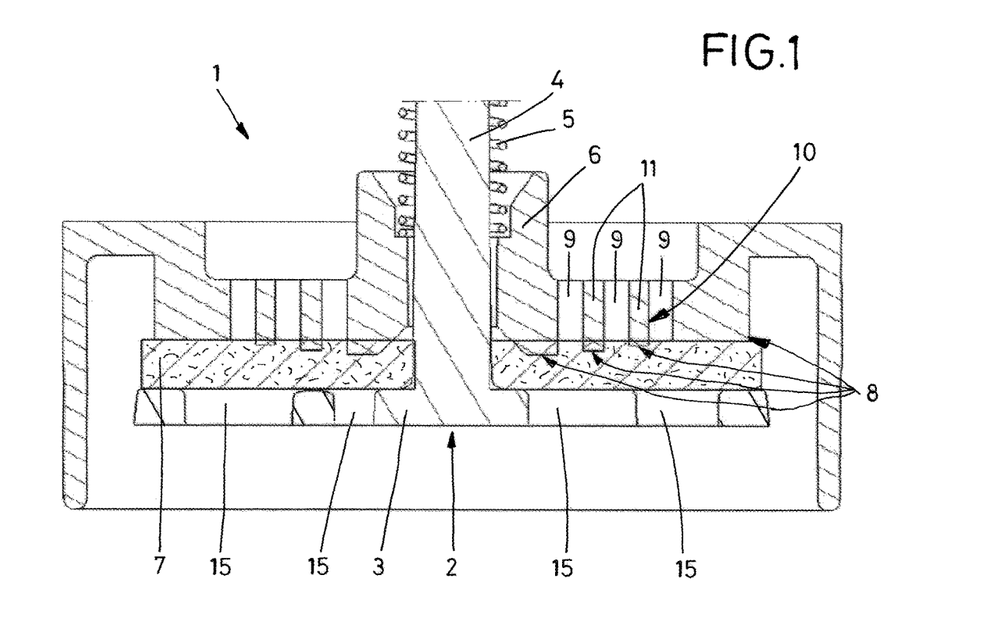
FIG. 1 is a cross-sectional view through a first embodiment of a pressure-limiting valve according to the invention in its closed position.

FIG. 1 is a cross-sectional view that illustrates a pressure-limiting valve 1 according to the invention. The pressure-limiting valve 1 has a valve body 2 that forms a valve plate 3 and a valve stem 4. A valve spring 5 supports the valve body 2 on a component that is referred to as a seat component 6. The valve spring 5 is a compression spring that applies a force to the valve stem 4 that urges the valve body 2 upwards relative to the seat component 6, i.e., to a closed position.

A coalescing medium 7 is provided on the valve plate 3. This coalescing medium 7 is a flat, round disc, made of a non-woven, compressible material, with a central hole through which the valve stem 4 extends. The force of the valve spring 5 urges the valve plate 3 upward, thereby pressing the coalescing medium 7 against the seat component 6 and causing the coalescing medium to compress. In this illustration, the coalescing medium 7 is shown essentially in a decompressed state. Elements of the seat component 6, however, press against the coalescing medium 7 and actually cause compression at those locations and this compression is indicated in FIG. 1 where elements of the seat component 6 are shown penetrating into the coalescing medium 7.

The coalescing medium 7 is shown making contact against the seat component 6 along a surface that is referred to as a valve seat 8. In a radially outer region, the coalescing medium 7 lies uncompressed against the valve seat 8, whereas the remaining surfaces of the valve seat 8 toward a radially inner region compress the coalescing medium 7 lying against the valve seat 8 to varying degrees, the areas of compression the corresponding to the penetrations shown in FIG. 1.

A plurality of individual nozzle openings 9 are provided in the seat component 6. The nozzle openings 9 and their corresponding passages are separated or delimited from one another by webs 11 of the seat component 6 and are collectively referred to as a nozzle arrangement 10.

Flow-through passages or openings 15 are also provided in the valve plate 3. These openings 15 provide exit flow paths through the valve plate 3 for the gas that flows through the nozzle arrangement 10 and into the coalescing medium 7.

FIG. 1 shows the pressure-limiting valve 1 in its closed position, in which the valve plate 3 along with the coalescing medium 7 is pressed up against the valve seat 8, with all of the nozzle openings 9 of the nozzle arrangement 10 covered by the coalescing medium 7. This closed position represents a strictly separator mode of operation of the pressure-limiting valve 1, wherein the entire stream of gas flows through the coalescence medium 7, where the aerosols entrained in the gas flow are separated out.

Pressure from the gas flow exerts a force on the valve body 2 in a direction opposite to the action of the valve spring 5, and a sufficiently strong flow of gas opens the pressure limiting valve 1 against the action of the valve spring 5. At low volume flows, however, the valve body 2 remains in the closed position shown in FIG. 1. Due to the fact that the coalescing medium 7 is compressed by the valve seat 8 in the area of the nozzle arrangement 10, the spacing of the fibers within the non-woven fabric that make up the coalescing medium 7 is very dense at low volumes of flow.

Figure 2:
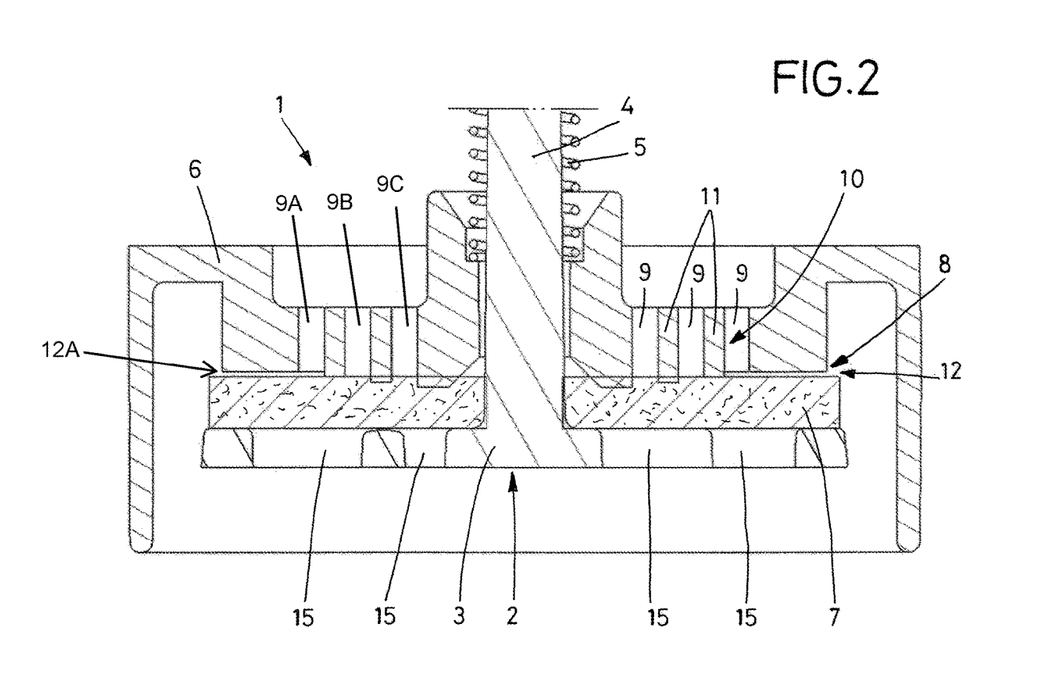
FIG. 2 is a cross-sectional view of the pressure-limiting valve of FIG. 1 in a first intermediate position, illustrating a first gap length.

FIG. 2 shows the pressure-limiting valve 1 of FIG. 1 in an intermediate position in which an increase in volume of flow has forced the valve body 2 to move counter to the action of the valve spring 5 partially away from its closed position and in the direction of an open position of the valve 1. As shown in this figure, the valve body 2 has been moved away from the valve seat 8 just enough to move the upper surface of the coalescing medium 7 away from the valve seat 8 in the radially outer region so that the coalescing medium 7 no longer makes contact against the valve seat 8, resulting in a gap 12 in this outer region, the gap having a gap length that is designated here in this illustration as gap length 12A. A first nozzle opening 9A now opens into the gap 12, instead of into the coalescing medium 7. At the same time, the radially inner region of the coalescing medium 7 remains in contact against the corresponding region of the valve seat 8 and remains compressed to varying degrees by the elements of the valve seat 8, as the illustrated penetrations show.

Figure 3:
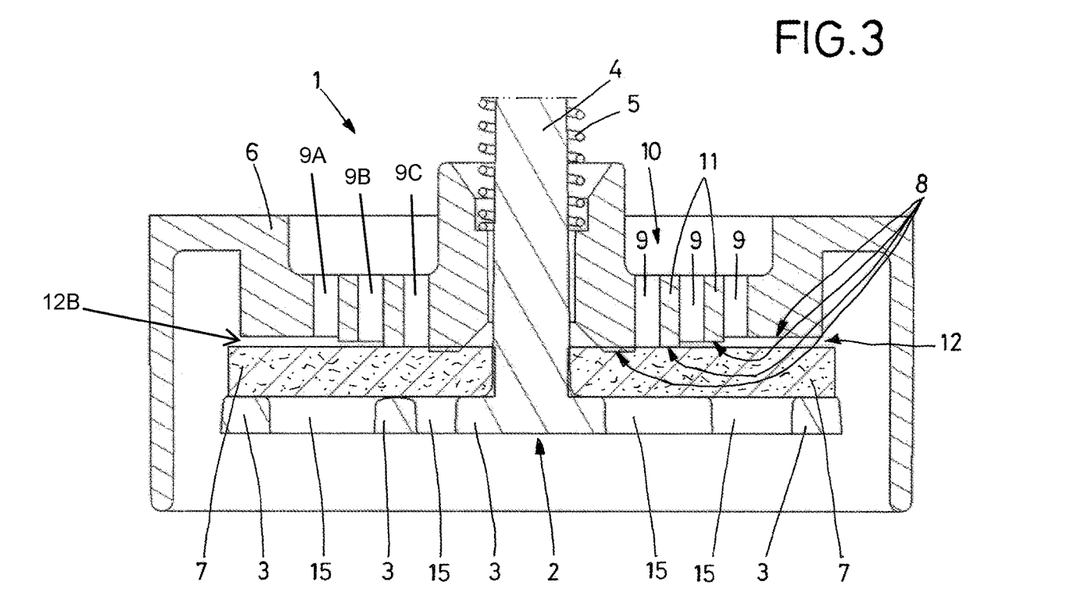
FIG. 3 is a cross-sectional view of the pressure-limiting valve of FIG. 1 in a second intermediate position, illustrating an increased gap length.

FIG. 3 shows a further intermediate state of the pressure-limiting valve 1, resulting from a further increase in the volume of flow through the pressure-limiting valve 1. In this intermediate stage, the valve plate 3 is moved again a bit farther away from the valve seat 8, thereby increasing the gap width of the gap 12, as well as the gap length, designated here as 12B, and as a result now a second nozzle opening 9B also opens into the gap 12, and only a radially inner third nozzle opening 9C of the nozzle arrangement 10 opens into the coalescing medium 7.

The gap 12, with the gap lengths 12A and 12B, result in the respective nozzle openings 9A and 9B being in flow connection with the gap 12, with the consequence that the gas flowing through these nozzle openings 9A and 9B goes through a change in direction of flow, and, instead of flowing straight ahead into the coalescing medium 7, the gas flows through the gap 12 along the surface of the coalescing medium 7. In these intermediate stages, the pressure-limiting valve 1 operates in impactor mode in the radially outer region and in separator mode in the radially radially inner region.

Figure 4:
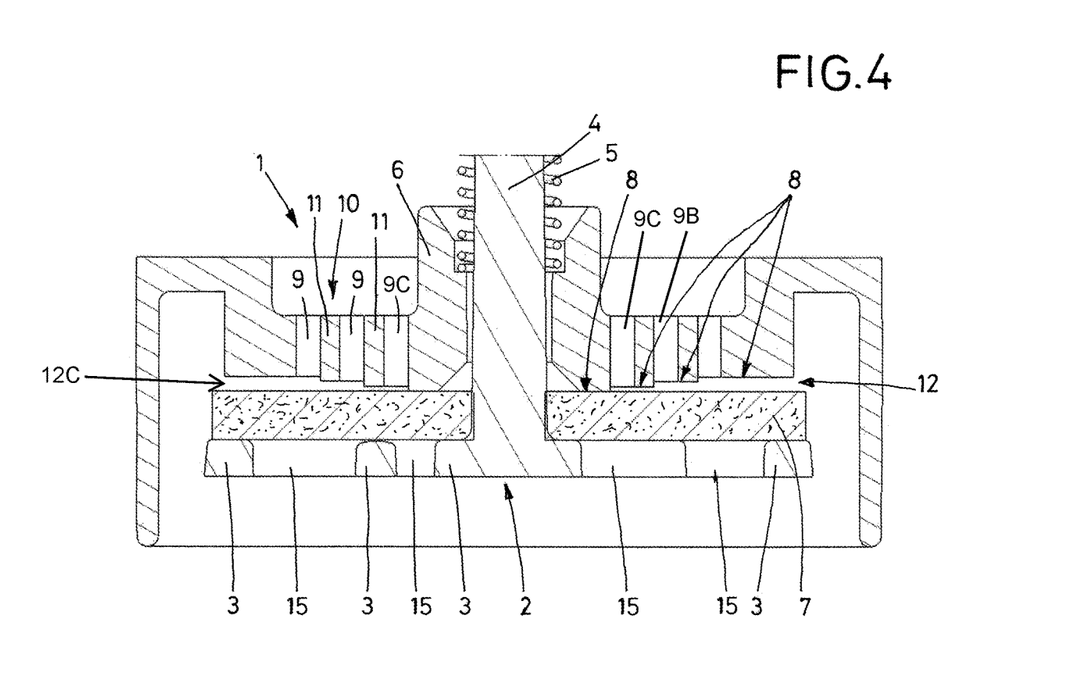
FIG. 4 is a cross-sectional view of the pressure-limiting valve of FIG. 1 in a fully open position, illustrating a maximal gap length.

FIG. 4 shows the pressure-limiting valve 1 in its fully open position, i.e., the valve plate 3 and the coalescing medium 7 are moved away from the valve seat 8 to such an extent that the gap length, designated in this illustration as 12C, is at its maximum size and all of the nozzle openings 9A, 9B, and 9C of the nozzle arrangement 10 open into the gap 12. The coalescing medium 7 remains in contact with the valve seat 8 in the radially innermost region, but this has no effect on the flow-through ability of the nozzle arrangement 10, because there are no nozzle openings 9 in this innermost region.

Figure 5:
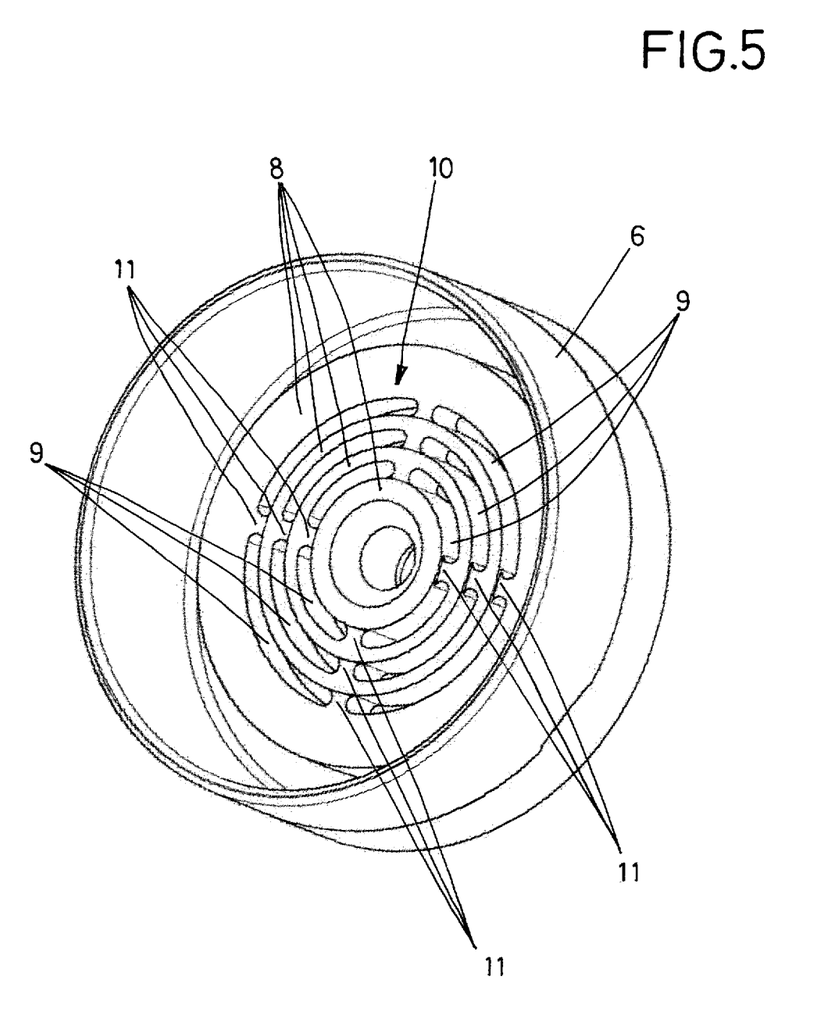
FIG. 5 is a perspective view of the interior of the valve seat of the pressure-limiting valve of FIGS. 1 to 4.

FIG. 5 is a perspective view of the interior of the seat component 6 with annular, stepped individual sections of the valve seat 8 and webs 11, which extend between the nozzle openings 9 of the nozzle arrangement 10.

FIGS. 6-9 illustrate side plane views of various profiles of the valve seat 8 on the valve component 6. In these illustrations, the outer collar of the seat component 6 that is shown in the previous FIGS. 1-5 is not shown. Common to all of the various valve seat profiles is the fact that the radially inner region of the valve seat 8 extends closer to the valve plate 3 and the coalescing medium 7 than the region that is located farther away from the inner region.

Figure 6:
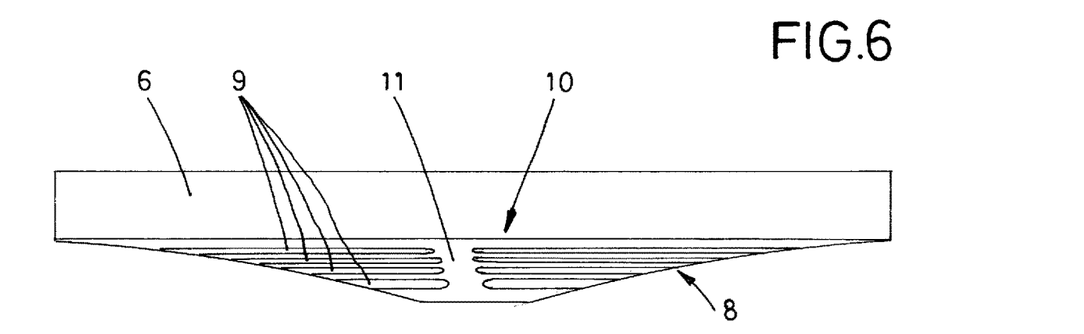
FIG. 6 is an elevation view of a first embodiment of the valve seat, illustrating a concave profile.
Figure 7:
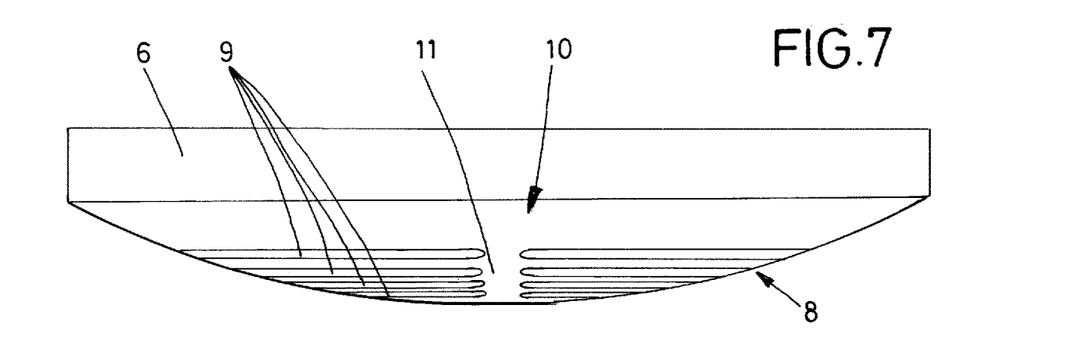
FIG. 7 is an elevation view of a second embodiment of the valve seat, illustrating a convex profile.
Figure 8:
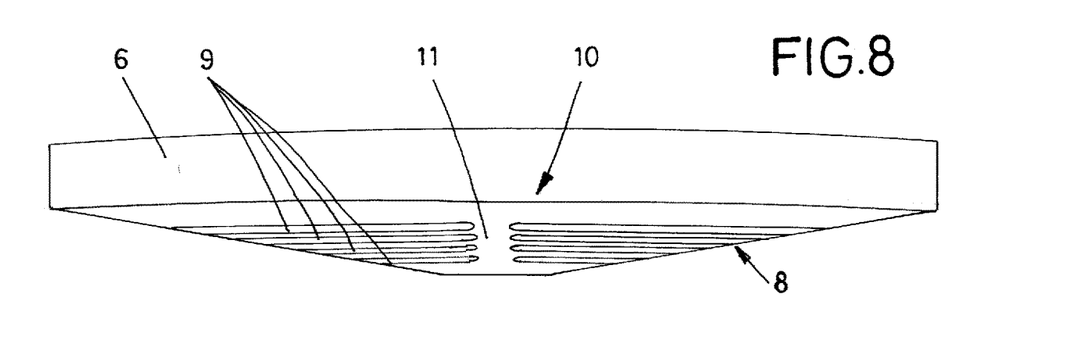
FIG. 8 is an elevation view of a third embodiment of the valve seat, illustrating a straight conical profile.
Figure 9:
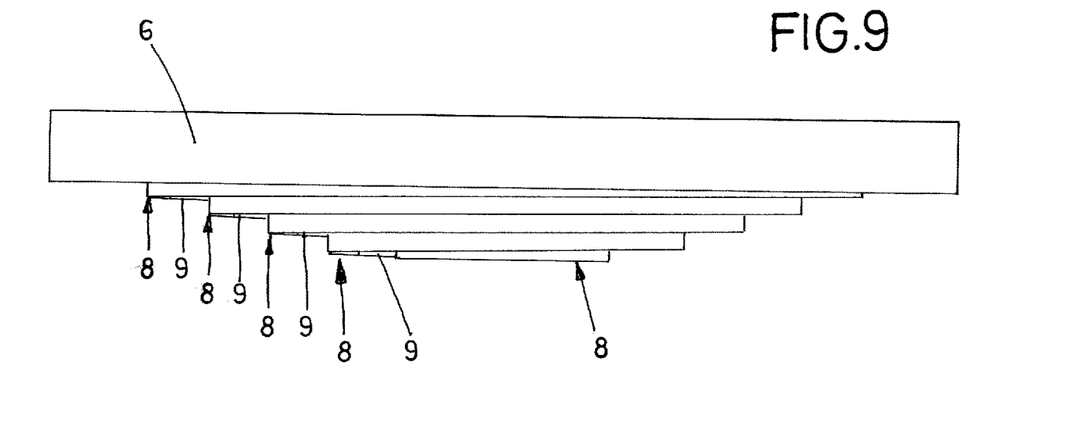
FIG. 9 is an elevation view of a fourth embodiment of the valve seat, illustrating a spiral construction.

FIG. 6 shows a first profile of the radially inner region of a seat component 6, which extends in a concave curved profile. FIG. 7 shows a second profile of the radially inner region of the valve seat component 6, which extends in a convex curved profile, that is to say, in an outwardly bulging curvature. FIG. 8 shows a third profile that is conical, with the profile extending outward from the center in a straight line. FIG. 9 shows a fourth profile of the radially inner region of the seat component 6 that is formed as a spiral, the nozzle openings 9 situated between ridges of the spiral.

Figure 10:
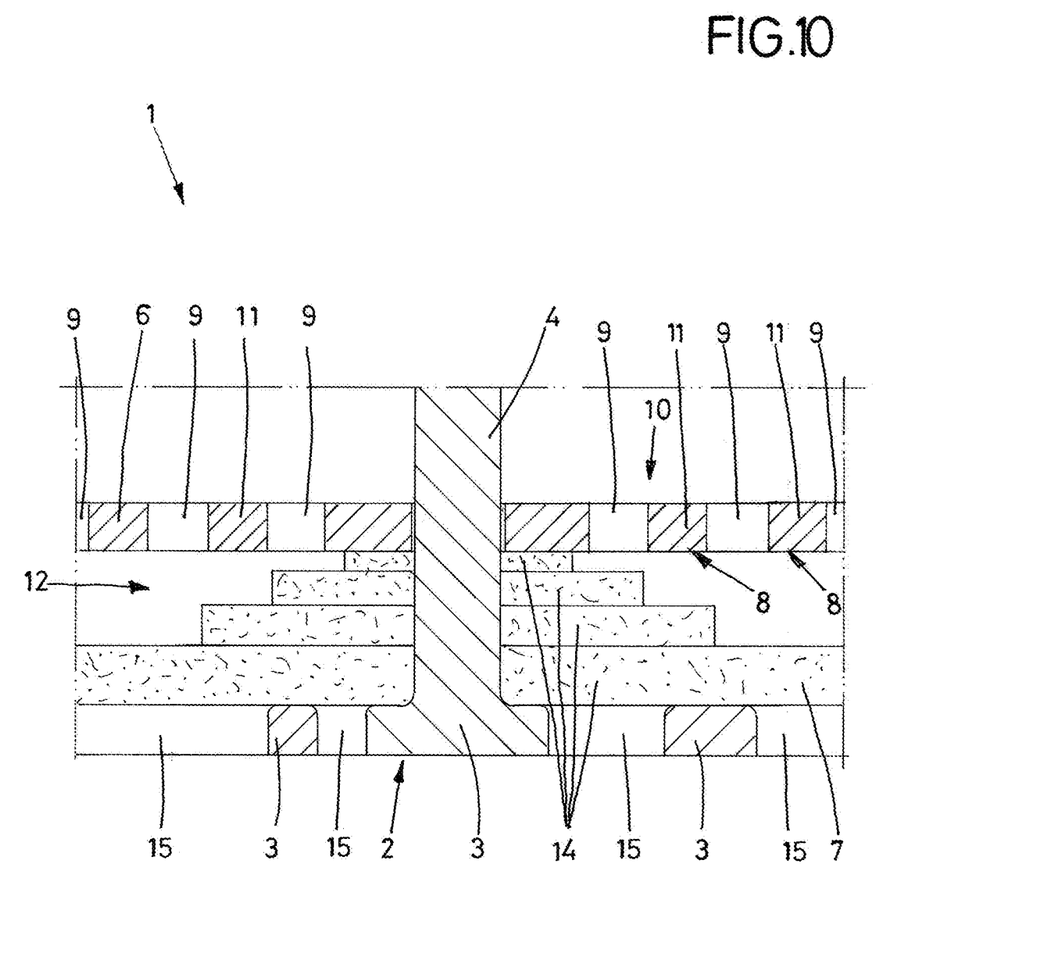
FIG. 10 is an elevation view similar to that of FIG. 4, illustrating the pressure-limiting valve in its fully open position and a three-dimensional construction of the coalescing medium, the central portion of which extends close to the center of the valve seat.

FIG. 10 is a cross-sectional view of a second embodiment of the pressure-limiting valve 1 according to the invention, showing the pressure-limiting valve 1 in its fully open position. In this embodiment, the surface of the valve seat 8 facing the coalescing medium 7 has a planar construction and the coalescing medium 7 has a three-dimensional, stepped construction. This stepped construction is achieved by stacking differently sized flat disks 14 one above the other. The disks are made from compressible material, such as was described above with reference to the coalescing medium 7. In the embodiment shown, the materials used for the disks are of different thicknesses. This is only by way of example. It is, of course, possible to use disks 14 of the same material thickness, which is particularly advantageous, as they can be cut from the same sheet of material.

In the embodiment of FIG. 10 and also in the other embodiments, the fiber spacing within the coalescing medium 7 in the decompressed state is greater than in the compressed state. The difference in fiber spacing is, however, not a disadvantage for the performance of the coalescing medium 7 in separator mode, because, when the volume of flow is high, those portions of the gas stream that are not deflected into the gap 12, but instead flow into the coalescing medium 7, enter at such a high flow rate that, under these conditions, the separator efficiency of the coalescing medium 7 remains high.

It is understood that the embodiments described herein are merely illustrative of the present invention. Variations in the construction of the pressure-limiting valve may be contemplated by one skilled in the art without limiting the intended scope of the invention herein disclosed and as defined by the following claims.

What is claimed is:

1. A pressure-limiting valve for use in a gas line carrying aerosols, the pressure-limiting valve comprising:
- a valve body having one or more body openings;
- a valve seat having a nozzle arrangement that includes a plurality of nozzle openings; and
- a coalescing medium made of compressible material and provided between the valve body and the valve seat;
- wherein the valve body is urged by a force device to a closed position and is movable between the closed position, in which the valve body holds the coalescing medium up against the valve seat, the flow of gas then being through the nozzle openings, the coalescing medium, and through the openings in the valve body, and a fully open position in which all the nozzle openings are in flow connection with a gap that is created between the coalescing medium and the valve seat; and
- wherein a surface profile of a coalescing medium surface and a surface profile of a valve seat surface are offset from one another, the surface profile of the valve seat having a stepped construction such that as the valve body moves toward the open position the distance of the valve body and the coalescing medium from the valve seat gradually increases, thereby creating an increasing large-area gap between the coalescing medium and the valve seat.

2. The pressure limiting valve of claim 1,
- wherein, an inner region of the valve seat surface and an inner region of the coalescing medium surface are closer to each other than at outer regions of the respective surfaces.

3. Pressure-limiting valve according to claim 2,
- wherein the valve seat surface facing the coalescing medium curves concavely from a central region to the edge of the valve seat.

4. Pressure-limiting valve according to claim 2,
- wherein the valve seat surface curves convexly from a central region to the edge of the valve seat.

5. Pressure-limiting valve according to claim 2,
wherein the valve seat surface extends in a straight line from a central region to the edge of the valve seat.

6. The pressure-limiting valve according to claim 2,
wherein the valve seat surface extends in a spiral from a central region to the edge of the valve seat.

7. The pressure-limiting valve according to claim 1, wherein the coalescing medium is constructed as a flat disc.

8. The pressure-limiting valve according to claim 1, wherein a profile of the coalescing medium surface has a three-dimensional construction.

9. The pressure-limiting valve according to claim 8,
wherein the coalescing medium is constructed with a plurality of concentrically arranged, flat disks of varying diameters, and
wherein a central region of the three-dimensional construction is closer to the valve seat than at the edge.

10. The pressure-limiting valve of claim 1, wherein the coalescing medium contains a multitude of fibers.

11. The pressure-limiting valve of claim 1, wherein the coalescing medium is constructed from a non-woven material.

12. An oil separator comprising:
a pressure-limiting valve that has a valve body having one or more body openings, a valve seat having a nozzle arrangement that includes a plurality of nozzle openings, and a coalescing medium made of compressible material and provided between the valve body and the valve seat;
wherein the valve body is urged by a force device to a closed position and is movable between the closed position, in which the valve body holds the coalescing medium up against the valve seat, the flow of gas then being through the nozzle openings, the coalescing medium, and through the openings in the valve body, and a fully open position in which all the nozzle openings are in flow connection with a gap that is created between the coalescing medium and the valve seat; and
wherein a surface profile of a coalescing medium surface and a surface profile of a valve seat surface are offset from one another, the surface profile of the valve seat having a stepped construction such that as the valve body moves toward the open position the distance of the valve body and the coalescing medium from the valve seat gradually increases, thereby creating an increasing large-area gap between the coalescing medium and the valve seat.

13. A pressure-limiting valve for regulating a flow of gas containing aerosols, the pressure-limiting valve comprising:
a valve seat component that includes a nozzle arrangement having a plurality of radially spaced-apart nozzle openings and a valve seat surface;
a valve body that has a valve plate with plate openings, the valve body being urged toward a closed position and movable toward an open position when pressure from the flow of gas increases; and a coalescing medium arranged on the valve plate, the coalescing medium made of a compressible material and having a coalescing medium surface that faces the valve seat surface;

wherein the valve seat surface has a surface profile that is not shaped complementary to a profile of the coalescing medium surface, such that, when the valve plate begins to move away from the valve seat, a gap having a gap length that is initially created at an outer region of the valve seat continues to extend toward an inner region as the valve plate continues to move farther from the valve seat, so that, depending on a distance of the valve plate from the valve seat, the radially spaced-apart nozzle openings open successively into the gap, first from the outer region and progressing successively toward the inner region.

* * * * *